Patented Nov. 18, 1952

2,618,635

UNITED STATES PATENT OFFICE 2,618,635

MIXED CELLULOSE ETHER

Charles L. P. Vaughan, Wilmington, Del., assignor to Hercules Powder Company, Wilmington, Del., a corporation of Delaware No Drawing. Application December 23, 1949, Serial No. 134,853

11 Claims. (Cl. 260—231)

This invention relates to the preparation of new mixed ethers of cellulose and, more particularly, to new cellulose ethers containing both carboxyethyl and hydroxyethyl groups.

The many applications for water-soluble cellulose derivatives have led to a continued search for such products which may be produced on a commercial scale. Very few are commercially available and these suffer from such disadvantages as insolubility at elevated temperatures or in the presence of many cations or strong acids.

Now in accordance with this invention it has been found that new mixed cellulose ethers containing both carboxyethyl and hydroxyethyl groups, which ethers are water soluble, may be prepared by hydroxyethylating cellulose with a hydroxyethylation agent and then reacting the hydroxyethyl cellulose with a carboxyethylating agent selected from the group of acrylamide, acrylonitrile, and alkyl acrylates. These new mixed ethers may also be prepared by first introducing the carboxyethyl group and then reacting the carboxyethyl cellulose with a hydroxyethylating agent. These new products may be defined as carboxyethyl hydroxyethyl cellulose containing at least about 0.05 carboxyethyl group and at least about 0.05 hydroxyethyl group per anhydroglucose unit and preferably containing from about 0.05 to about 0.9 carboxyethyl group and from about 0.05 to about 0.75 hydroxyethyl group per anhydroglucose unit, the total degree of substitution being at least about 0.1 substituent group per anhydroglucose unit in the cellulose molecule, preferably from about 0.1 to about 1.65 and more preferably from about 0.35 to about 1.0 substituent groups per anhydroglucose unit. The carboxyethyl hydroxyethyl celluloses, in accordance with this invention, are soluble in water and alkali and frequently are soluble in acid, depending upon the degree of substitution.

The following examples will illustrate the preparation of the mixed carboxyethyl hydroxyethyl ethers of cellulose in accordance with this invention. All parts and percentages are by weight unless otherwise indicated.

Example 1

Five parts of a hydroxyethyl cellulose having a degree of substitution of 0.35 were suspended in 100 parts of dioxane and 11 parts of an aqueous 40% sodium hydroxide solution (4 moles per base weight of hydroxyethyl cellulose) were added. The reaction mixture was heated to 70° C. and agitated at that temperature for ½ hour after which 0.8 part of acrylamide (0.4 mole per base weight) was added and the reaction continued at 70° C. for 2 hours. The fibrous product was washed repeatedly with 80% methanol, then with anhydrous methanol and finally was dried in vacuo at 60° C. The white fibrous carboxyethyl hydroxyethyl cellulose so produced contained 0.35 hydroxyethyl and 0.20 carboxyethyl group per anhydroglucose unit, which was equal to a total substitution of 0.55. It was soluble in water and dilute alkali to give clear, viscous solutions in each case.

Example 2

Five parts of a hydroxyethyl cellulose having a degree of substitution of 0.35 were suspended in 100 parts of dioxane and 8.5 parts of an aqueous 40% sodium hydroxide solution (3 moles per base weight) were added. The reaction mixture was heated to 80° C. for ½ hour and then 1.41 parts of ethyl acrylate (0.5 mole per base weight) was added and the reaction continued at 80° C. for 2 hours. The fibrous product was isolated and purified as described in Example 1. On analysis it was found to contain 0.22 carboxyethyl group per anhydroglucose unit, which was equal to a total substitution of 0.57. This carboxyethyl hydroxyethyl cellulose was soluble in water and dilute alkali to give clear, viscous solutions in each case.

Example 3

Four parts of a hydroxyethyl cellulose having a degree of substitution of 0.30 were suspended in 100 parts of dioxane and 18 parts of an aqueous 20% sodium hydroxide solution (4 moles per base weight) were added. The reaction mixture was heated to 70° C. for ½ hour after which 6.49 parts of acrylamide (4 moles per base weight) were added and the reaction allowed to continue for 3 hours at 70° C. The fibrous product was isolated and purified as described in Example 1. On analysis it was found to contain 0.51 carboxyethyl group and 0.12 carbamylethyl group per anhydroglucose unit, which was equal to a total substitution of 0.93 substituent group per anhydroglucose unit. This carboxyethyl hydroxyethyl cellulose was soluble in dilute alkali and water to give clear, viscous solutions in each case and was also soluble in a 20% acetic acid and a 10% hydrochloric acid solution to give a clear, viscous solution in each case.

Example 4

Ten parts of a hydroxyethyl cellulose having a degree of substitution of 0.15 were suspended in 200 parts of dioxane. To this mixture was added 21 parts of an aqueous 40% sodium hydroxide solution (3.6 moles per base weight) and the mixture was heated at reflux temperature for one hour. N-butyl acrylate (22.7 parts, which was equal to 3 moles per base weight) was then added and the reaction continued at 90°–95° C. for 4 hours. The white fibrous product was isolated and purified as described in Example 1. On analysis it was found to contain 0.26 carboxyethyl group per anhydroglucose unit, the total degree of substitution of the product being 0.41 substituent group per anhydro glucose unit. It was soluble in dilute alkali and water to give clear, viscous solutions in each case.

*Example 5*

Four parts of hydroxyethyl cellulose having a degree of substitution of 0.30 were suspended in 80 parts of tert.-butyl alcohol and 9 parts of an aqueous 40% sodium hydroxide solution (4 moles per base weight) were added. The reaction mixture was agitated at 70° C. for ½ hour and then acrylonitrile, 4.85 parts which was equal to 4 moles per base weight, were added and the reaction continued at 70° C. for 3 hours. The fibrous product was isolated and purified as described in Example 1. On analysis it was found to contain 0.30 carboxyethyl group and 0.03 cyanoethyl group per anhydroglucose unit, which was equal to a total substitution of 0.63 substituent group per anhydroglucose unit. This product was soluble in dilute alkali and water to give clear, viscous solutions in each case.

*Example 6*

Five parts of a hydroxyethyl cellulose having a degree of substitution of 0.35 were suspended in 100 parts of dioxane and 9 parts of an aqueous 50% sodium hydroxide solution (4 moles per base weight) were added. After agitating this mixture at 80° C. for ½ hour, 0.8 part of acrylamide (0.4 mole per base weight) was added and the reaction continued at 80° C. for 2 hours. The fibrous product was isolated and purified as described in Example 1. On analysis the product was found to contain 0.13 carboxyethyl group per anhydroglucose unit, which was a total substitution of 0.48 substituent group per anhydroglucose unit. This carboxyethyl hydroxyethyl cellulose was soluble in water to give a clear, viscous solution.

*Example 7*

Five parts of a hydroxyethyl cellulose having a degree of substitution of 0.35 and base weight of 177 were suspended in 80 parts of isopropyl alcohol and 11 parts of a 40% aqueous sodium hydroxide solution (4 moles per base weight) were added. The reaction mixture was heated to 70° C. and agitated at that temperature for ½ hour after which 1.56 parts of β-chloropropionic acid dissolved in a minimum amount of isopropyl alcohol were added and the reaction continued at 70° C. for 3 hours. The fibrous product was washed repeatedly with 80% methanol, then with anhydrous methanol and finally was dried in vacuo at 60° C. The carboxyethyl hydroxyethyl cellulose so obtained contained 0.35 hydroxyethyl and 0.21 carboxyethyl group per anhydroglucose unit and was soluble in water.

*Example 8*

Six parts of chemical cotton were suspended in 75 parts of tert.-butyl alcohol and 12 parts of a 20% aqueous sodium hydroxide solution were added. The mixture was agitated at room temperature for about 1 hour, 8.87 parts of ethylene oxide were added and the reaction mixture was then heated to 65°–70° C. over a period of 1 hour. After agitating the reaction mixture at this temperature for 4 hours, 1.21 parts of acrylamide were added and the reaction was continued at 70° C. for 2 hours. The fibrous product was washed with methanol and dried. The carboxyethyl hydroxyethyl cellulose so obtained contained 0.32 hydroxyethyl and 0.18 carboxyethyl group per anhydroglucose unit and was water soluble.

The new carboxyethyl hydroxyethyl ethers of cellulose in accordance with this invention may be prepared by the carboxyethylation of a hydroxyethyl cellulose or by the hydroxyethylation of a carboxyethyl cellulose. When prepared by the former process, the product may contain in addition to the carboxyethyl and hydroxyethyl groups, carboxyethylated hydroxyethyl groups, due to the possible carboxyethylation of the hydroxyethyl groups. However, when the product is prepared by the hydroxyethylation of carboxyethyl cellulose, it, of course, contains only the two substituent groups.

The hydroxyethyl cellulose used as a starting material may be prepared by any desired means but should contain at least about 0.05 hydroxyethyl group per anhydroglucose unit and preferably from about 0.05 to about 0.75 hydroxyethyl group per anhydroglucose unit. Such hydroxyethyl ethers of cellulose are readily prepared by reacting cellulose with a hydroxyethylating agent such as ethylene oxide, ethylene chlorohydrin, etc. in the presence of an alkaline reagent. Any cellulosic material may be used as, for example, chemical cotton, wood pulp, etc., and it may be in any of the usual physical forms. The hydroxyethylation reaction may be carried out by either a solution or fibrous process. The latter is preferable for carrying out the reaction in accordance with this invention since it is then not necessary to isolate the hydroxyethyl cellulose and the carboxyethylation reaction may be carried out directly.

In carrying out the hydroxyethylation reaction by the fibrous process the cellulosic material is suspended in an inert organic solvent and alkali added, or the cellulosic material may be pretreated with the alkali and the crumbs of alkali cellulose so formed then suspended in the inert organic solvent. The hydroxyethylating agent such as ethylene oxide or ethylene chlorohydrin is then added and the reaction allowed to proceed, usually at a temperature within the range of from about 20° C. to about 150° C. Any organic solvent which is inert to the hydroxyethylating agent may be used as, for example, dioxane, isopropanol, tertiary butyl alcohol, etc.

The carboxyethylation of the hydroxyethyl cellulose may also be carried out by either a solution or fibrous process, but the latter having many advantages over the solution or dough process, is preferable. The carboxyethyl group may be introduced into the hydroxyethyl cellulose by treating the hydroxyethyl cellulose with alkali and then reacting it with a β-halopropionic acid or by the addition reaction of an acrylic compound with the hydroxyethyl cellulose in the presence of an alkaline reagent. The halopropionic acids are expensive and not readily available on a commercial scale. However, the carboxyethylation reaction by means of an acrylic compound readily takes place and is a commercially feasible operation.

It has been discovered that in order to carry out the carboxyethylation reaction by means of an acrylic compound, the acid group of the acrylate should be blocked since neither acrylic acid nor the salts thereof appear to react with the hydroxyethyl cellulose. However, it has been found that alkyl acrylates, acrylonitrile and acrylamide will readily react to introduce carboxyethyl groups into the hydroxyethyl cellulose. It might be expected that the product obtained by carrying out the reaction with an alkyl acrylate, acrylonitrile, or acrylamide would be in the form of the ester, nitrile or amide, respectively, but this is not the case. The product obtained is, in each instance, the carboxyethyl ether of hydroxyethyl cellulose in the form of its salt, the ester, nitrile or amide group having been hydrolyzed under the conditions of the reaction. Thus, the ethylenic addition and hydrolysis of the ester, nitrile, or amide group appear to take place simultaneously. Whether these two reactions actually occur simultaneously or whether they take place as two separate, but rapidly succeeding reactions, is not known.

The carboxyethylation reaction is most readily carried out by a fibrous process. The hydroxyethyl cellulose may be suspended in an inert organic solvent and alkali added or it may be pretreated with the alkali and then suspended in the inert organic solvent. In any case, the alkaline reagent used to bring about the reaction is any strongly alkaline reagent and preferably is an alkali hydroxide such as sodium or potassium hydroxide. The amount of alkali added is usually adjusted to approximately one mole per etherifiable hydroxyl group, although the reaction proceeds favorably with higher or slightly lesser amounts of alkali. If larger amounts are used, care should be taken to avoid the use of such excesses as would dissolve the hydroxyethyl cellulose and destroy its fibrous structure. After adding the alkali, the mixture is agitated at room temperature or higher, if desired, for about 0.5 to 1 hour to complete the alkali cellulose formation.

Any organic solvent which is inert under the reaction conditions, i. e., inert to the acrylic compound being added, may be used for carrying out the carboxyethylation of the hydroxyethyl cellulose. Examples of such solvents are dioxane, isopropanol, tertiary butyl alcohol, tetrahydrofuran, ethylene glycol diethyl ether, benzene, toluene, etc. Usually organic solvents which are water soluble are preferable since in such media water cannot accumulate in the hydroxyethyl cellulose derivative phase. However, the carboxyethylation reaction may be carried out successfully in a water-insoluble solvent. The amount of solvent used is determined by the type of agitation available for the heterogeneous reaction, since mixing becomes increasingly difficult with increasing proportions of the cellulose ether.

The carboxyethylation of the hydroxyethyl cellulose, when carried out by the fibrous process, is usually carried out at a temperature of about 50° C. to about 140° C. and preferably at about 70° C. to about 95° C. If the particular solvent being used as the medium for the reaction possesses a boiling point below this temperature range, the reaction may be carried out under pressure. The temperature of the suspension of alkali hydroxyethyl cellulose is preferably adjusted to the reaction temperature prior to the addition of the acrylic compound. Following this addition, the reaction is allowed to proceed at the specified temperature for about 0.5 to about 4 hours and preferably for about 2 hours. Longer reaction times may be used but it is believed that no advantage is realized and, in fact, after 16 hours, de-etherification of the product is noticeable.

It is also possible, as may be seen in the examples, to prepare carboxyethyl hydroxyethyl cellulose directly from cellulose in a unitary reaction process when the reaction is carried out by the fibrous or slurry process. The cellulose is either treated with alkali to form crumbs or alkali cellulose which are then suspended in the diluent or the cellulose may be suspended in the cellulose and then treated with alkali. In either case, the alkali cellulose is first hydroxyethylated and then without isolation of the hydroxyethyl cellulose, the carboxyethylation agent is added. In general, the same reaction conditions are used for both the hydroxyethylation reaction and the carboxyethylation reaction. Thus it is possible to produce a carboxyethyl hydroxyethyl cellulose of the desired degree of substitution directly from cellulose by a simple and economical operation.

As pointed out above, the acrylic compound used for the carboxyethylation reaction in accordance with this invention may be an alkyl acrylate, acrylamide, or acrylonitrile. Any acrylic ester is operable, but the alkyl acrylates such as methyl, ethyl, propyl, n-butyl, tert.-butyl, etc. are preferable. The amount of the acrylic compound which is added to the hydroxyethyl cellulose is dependent upon the degree of etherification desired in the final product. Usually, from about 0.15 to about 4 moles of the alkyl acrylate, acrylamide, or acrylonitrile are added per anhydroglucose unit. The acrylic compound may be added as such or as a solution in an organic solvent.

The carboxyethyl hydroxyethyl cellulose, in the form of its alkali salt, may readily be isolated from the reaction mixture by filtration, centrifugation, etc., since it is in the same physical state as the original hydroxyethyl cellulose and is insoluble in the organic solvent medium. The product is, therefore, not only in a very desirable form but being in this form is very easily purified by a simple washing procedure. The solvent used for this washing operation should be one which will readily dissolve any unreacted acrylic compound which may be present, and the by-products of the reaction such as sodium acrylate formed by the hydrolysis of the acrylic compound, the ammonia or alcoholic by-product, and the alkaline reagent, but which solvent will not dissolve the carboxyethyl hydroyethyl cellulose. A convenient solvent for this purpose is methanol. Since methanol itself will dissolve an alkali hydroxide, but not an alkali acrylate, a methanol-water mixture, such as 70 to 80% methanol, is preferable for the preliminary washing step. However, other solvents are equally operable. An anhydrous solvent is usually used for the final wash in order to dehydrate the fibers. The carboxyethyl hydroxyethyl cellulose may then be dried in the form of its alkali salt, or, should the free acid form be desired, it may be acidified and isolated.

The carboxyethyl hydroxyethyl cellulose of this invention may also be prepared by the hydroxethylation of carboxyethyl cellulose. These reactions may be carried out in the same fashion as those described above but in the reverse order. The product in this case will then contain only carboxyethyl and hydroxyethyl substituents and cannot contain any carboxyethylated hydroxyethyl substituents.

As may be seen from the forgoing examples, the new cellulose derivatives of this invention have very desirable solubility properties which make them advantageous for many applications. They are water soluble at a total substitution of less than that necessary for water solubility for either hydroxyethyl cellulose or carboxyethyl cellulose. For example, a degree of substitution of about 0.3 is required for hydroxyethyl cellulose to be soluble in dilute alkali and about 1.0 for water solubility. Yet when an alkali-insoluble hydroxyethyl cellulose; i. e., having a degree of substitution of less than 0.3, is carboxyethylated, it is necessary to introduce only about 0.20 to 0.25 carboxyethyl group to obtain not only alkali solubility but also water solubility, or a total substitution of less than 0.5. Another advantage which these new mixed ethers have over either hydroxyethyl or carboxyethyl cellulose is that as the total degree of substitution increases the solubility in acid also increases whereas neither of the simple ethers is soluble in acid at any degree of substitution. The mixed ethers exhibiting acid solubility in general have a degree of substitution of about 0.50 to about 0.9 carboxyethyl group and about 0.30 to about 0.75 hydroxyethyl group. Thus the new mixed ethers of this invention will exhibit alkali, water, and acid solubility depending upon the total degree of substitution. For alkali solubility a total degree of substitution of only about 0.1 substituent group per anhydroglucose unit is required, for water solubility about 0.35, and for acid solubility about 0.8 substituent group per anhydroglucose unit is required. Thus the new carboxyethyl hydroxyethyl celluloses of this invention will have a total degree of substitution of at least about 0.1 per anhydroglucose unit, preferably about 0.1 to about 1.65, and more preferably about 0.35 to about 1.0 substituent groups per anhydroglucose unit.

The new carboxyethyl hydroxyethyl celluloses of this invention have many valuable applications. They are hydrophilic colloids which possess suspending, thickening, stabilizing, and film-forming properties. Thus they may be used as thickening agents in textile printing pastes, latex dispersions, etc. They may also be used in oil well drilling muds. At higher degrees of substitution they may be used in many applications requiring acid solubility due to their solubility over a wide pH range.

What I claim and desire to protect by Letters Patent is:

1. A mixed ether of cellulose containing as substituent groups, carboxyethyl and hydroxyethyl groups, said ether being water-soluble and containing at least about 0.05 of each of said substituent groups per anhydroglucose unit and having a total degree of substitution of at least about 0.35 substituent group per anhydroglucose unit.

2. A mixed ether of cellulose containing as substituent groups, carboxyethyl, hydroxyethyl, and carboxyethylated hydroxyethyl groups, said ether being water-soluble and containing at least about 0.05 carboxyethyl group and at least about 0.05 hydroxyethyl group per anhydroglucose unit and having a total degree of substitution of at least about 0.35 substituent group per anhydroglucose unit.

3. A carboxyethyl hydroxyethyl ether of cellulose, soluble in water and containing from about 0.05 to about 0.9 carboxyethyl group per anhydroglucose unit and from about 0.05 to about 0.75 hydroxyethyl group per anhydroglucose unit, the total degree of substitution being at least about 0.35 substituent group per anhydroglucose unit.

4. The process of preparing a mixed ether of cellulose containing carboxyethyl and hydroxyethyl groups as substituents, said ether being water-soluble and containing at least about 0.05 of each of said substituent groups per anhydroglucose unit and having a total degree of substitution of at least about 0.35 substituent group per anhydroglucose unit, which comprises reacting cellulose with a hydroxyethylating agent until the extent of hydroxyethylation exceeds 0.05 hydroxyethyl group per anhydroglucose unit and subsequently with from about 0.15 to about 4 moles of a carboxyethylating agent, said reactions being carried out in an inert organic solvent as the reaction medium and in the presence of an alkaline reagent at a temperature of from about 50° C. to about 140° C.

5. The process of preparing a mixed ether of cellulose containing carboxyethyl and hydroxyethyl groups as substituents, said ether being water-soluble and containing at least about 0.05 of each of said substituent groups per anhydroglucose unit and having a total degree of substitution of at least about 0.35 substituent group per anhydroglucose unit, which comprises reacting a suspension of an alkali cellulose in an inert organic solvent with a hydroxyethylating agent until the extent of hydroxyethylation exceeds 0.05 hydroxyethyl group per anhydroglucose unit and without separating the hydroxyethylated cellulose from the reaction mixture, reacting said hydroxyethylated cellulose with from about 0.15 to about 4 moles of a carboxyethylating agent, said reactions being carried out in the presence of an alkaline reagent at a temperature of from about 50° C. to about 140° C.

6. The process of preparing a mixed ether of cellulose containing carboxyethyl and hydroxyethyl groups as substituents, said ether being water-soluble and containing at least about 0.05 of each of said substituent groups per anhydroglucose unit and having a total degree of substitution of at least about 0.35 substituent group per anhydroglucose unit, which comprises reacting a suspension of an alkali cellulose in an inert organic solvent with a hydroxyethylating agent until the extent of hydroxyethylation exceeds 0.05 hydroxyethyl group per anhydroglucose unit and without separating the hydroxyethylated cellulose from the reaction mixture, reacting said hydroxyethylated cellulose with from about 0.15 to about 4 moles per anhydroglucose unit of a carboxyethylating agent selected from the group consisting of alkyl acrylates, acrylamide, and acrylonitrile, said reactions being carried out in the presence of an alkaline reagent at a temperature of from about 50° C. to about 140° C.

7. The process of preparing a mixed ether of cellulose containing carboxyethyl and hydroxyethyl groups as substituents, said ether being water-soluble and containing at least about 0.05 of each of said substituent groups per anhydroglucose unit and having a total degree of substitution of at least about 0.35 substituent group per anhydroglucose unit, which comprises reacting a suspension of an alkali cellulose in an inert organic solvent with a hydroxyethylating agent selected from the group consisting of ethylene oxide and ethylene chlorohydrin until the extent of hydroxyethylation exceeds 0.05 hydroxyethyl group per anhydroglucose unit and without separating the hydroxyethylated cellulose from the reaction mixture, reacting said hydroxyethylated cellulose with from about 0.15 to about 4 moles per anhydroglucose unit of a carboxyethylating agent selected from the group consisting of alkyl acrylates, acrylamide, and acrylonitrile, said reactions being carried out in the presence of an alkaline reagent at a temperature of from about 50° C. to about 140° C.

8. The process of preparing a water-soluble carboxyethyl hydroxyethyl cellulose containing at least about 0.5 of each of carboxyethyl and hydroxyethyl groups per anhydroglucose unit and having a total degree of substitution of at least about 0.35 substituent group per anhydroglucose unit, which comprises reacting a suspension of an alkali hydroxyethyl cellulose containing at least 0.05 hydroxyethyl group per anhydroglucose unit in an inert organic solvent with from about 0.15 to about 4 moles of a carboxyethylating agent selected from the group consisting of alkyl acrylates, acrylamide, and acrylonitrile in the presence of an alkaline reagent at a temperature of from about 50° C. to about 140° C.

9. The process of preparing a water-soluble carboxyethyl hydroxyethyl cellulose containing at least about 0.05 of each of carboxyethyl and hydroxyethyl groups per anhydroglucose unit and having a total degree of substitution of at least about 0.35 substituent group per anhydroglucose unit, which comprises reacting a suspension of an alkali hydroxyethyl cellulose containing at least 0.05 hydroxyethyl group per anhydroglucose unit in an inert organic solvent with from about 0.15 to about 4 moles of an alkyl acrylate in the presence of an alkaline reagent at a temperature of from about 50° C. to about 140° C.

10. The process of preparing a water-soluble carboxyethyl hydroxyethyl cellulose containing at least about 0.05 of each of carboxyethyl and hydroxyethyl groups per anhydroglucose unit and having a total degree of substitution of at least about 0.35 substituent group per anhydroglucose unit, which comprises reacting a suspension of an alkali hydroxyethyl cellulose containing at least 0.05 hydroxyethyl group per anhydroglucose unit in an inert organic solvent with from about 0.15 to about 4 moles of acrylonitrile in the presence of an alkaline reagent at a temperature of from about 50° C. to about 140° C.

11. The process of preparing a water-soluble carboxyethyl hydroxyethyl cellulose containing at least about 0.05 of each of carboxyethyl and hydroxyethyl groups per anhydroglucose unit and having a total degree of substitution of at least about 0.35 substituent group per anhydroglucose unit, which comprises reacting a suspension of an alkali hydroxyethyl cellulose containing at least 0.05 hydroxyethyl group per anhydroglucose unit in an inert organic solvent with from about 0.15 to about 4 moles of acrylamide in the presence of an alkaline reagent at a temperature of from about 50° C. to about 140° C.

CHARLES L. P. VAUGHAN.

REFERENCES CITED

The following references are of record in the file of this patent:

UNITED STATES PATENTS

| Number | Name | Date |
|---|---|---|
| 2,067,946 | Picton | Jan. 19, 1937 |
| 2,094,100 | Dreyfus | Sept. 28, 1937 |
| 2,137,343 | Maxwell | Nov. 22, 1938 |
| 2,163,723 | Whitehead | June 27, 1939 |
| 2,181,264 | Dreyfus | Nov. 28, 1939 |
| 2,338,681 | Bock et al. | Jan. 4, 1944 |
| 2,349,797 | Bock et al. | May 30, 1944 |
| 2,362,900 | Groombridge | Nov. 14, 1944 |
| 2,398,767 | Burke | Apr. 23, 1946 |
| 2,476,331 | Swinehart et al. | July 19, 1949 |
| 2,519,249 | Hutchinson | Aug. 15, 1950 |

FOREIGN PATENTS

| Number | Country | Date |
|---|---|---|
| 458,597 | Great Britain | Dec. 22, 1936 |
| 592,352 | Great Britain | Sept. 16, 1947 |